Dec. 23, 1930. E. R. AMBROSE 1,786,389
STRUCTURE OF AUXILIARY FLANGES FOR AUTOMOBILE WHEELS
Filed May 27, 1929 2 Sheets-Sheet 1

INVENTOR.
ERNEST R. AMBROSE.
BY
Charles and Cohn
ATTORNEYS.

Dec. 23, 1930.   E. R. AMBROSE   1,786,389
STRUCTURE OF AUXILIARY FLANGES FOR AUTOMOBILE WHEELS
Filed May 27, 1929   2 Sheets-Sheet 2

INVENTOR.
ERNEST R. AMBROSE
BY
*Charles and Cohn*
ATTORNEYS.

Patented Dec. 23, 1930

1,786,389

UNITED STATES PATENT OFFICE

ERNEST R. AMBROSE, OF TOPEKA, KANSAS, ASSIGNOR TO U. S. SAFETY FLANGE COMPANY, OF TOPEKA, KANSAS, A CORPORATION OF KANSAS

STRUCTURE OF AUXILIARY FLANGES FOR AUTOMOBILE WHEELS

Application filed May 27, 1929. Serial No. 366,491.

My invention relates to improvements in the structure of auxiliary flanges for automobile wheels and fastening means therefor.

The object of my invention is to provide a flange to be used as an auxiliary wheel to carry the load of an automobile wheel upon deflation of the tire.

A further object of my invention is to provide a flange of the kind described that is comparatively light in weight for the accommodation of the load imposed and in which the connection to the felloe does not distort its web portion from a plane perpendicular to the road.

These and other objects will hereinafter be more fully explained, reference being had to the accompanying drawing in which like characters apply to like parts in the different views.

Figure 1:
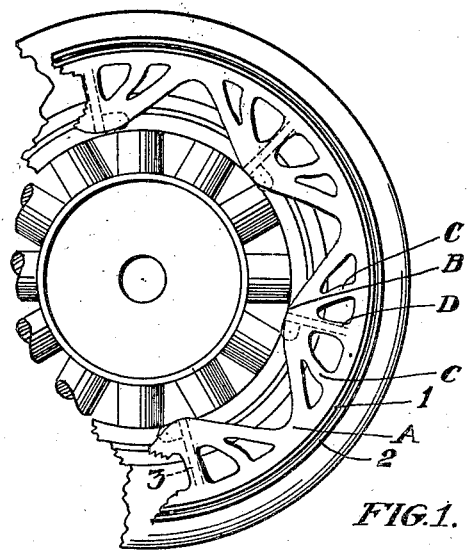
Fig. 1 is a fragmentary elevation of the flange in position on the felloe of an automobile wheel.
Figure 2:
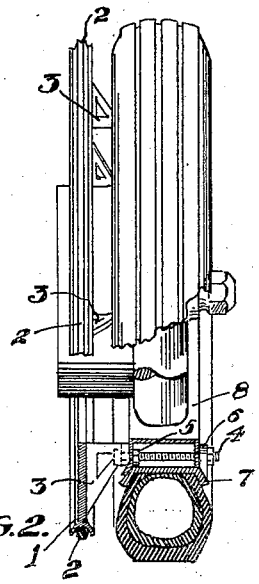
Fig. 2 is an edge elevation of Fig. 1 with parts removed for purposes of illustration and parts in section.
Figure 4:
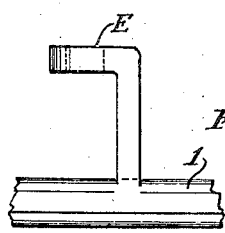
Fig. 4 is a fragmentary plan view of one of the knee members.
Figure 3:
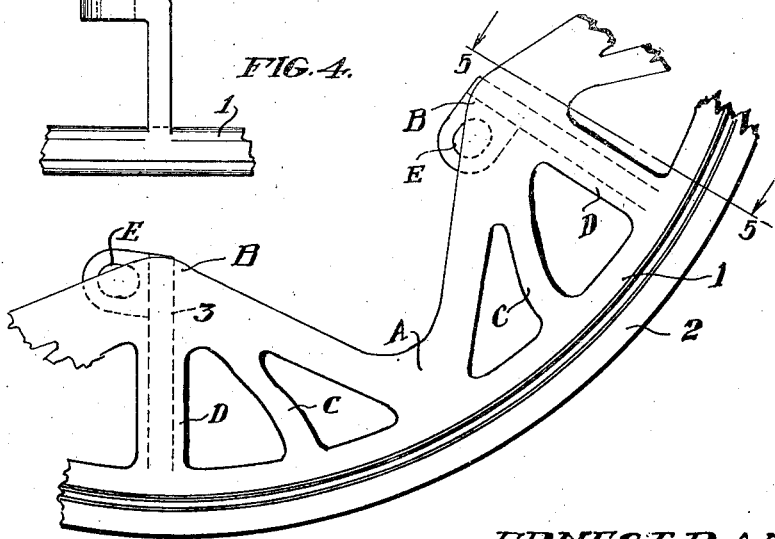
Fig. 3 is an enlarged fragmentary elevation of the flange.
Figure 5:
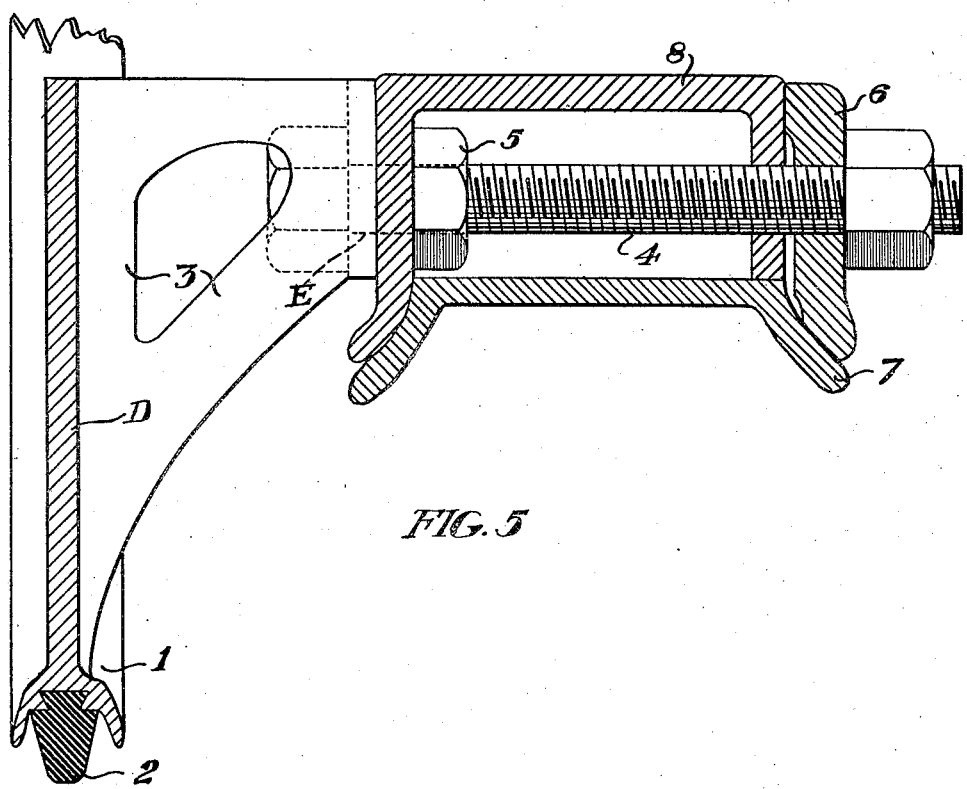
Fig. 5 is an enlarged cross sectional view of a wheel felly and my auxiliary flange attached thereto; the section of the flange being taken on the line 5—5 of Fig. 3.

A flange having a rim 1 carrying a hard rubber tire 2, has its web portion formed into a plurality of arch elements, the crowns of which as at A are integral with the rim 1, the haunches of which as at B are integral with the adjacent arches. Strut members C are positioned at intermediate portions between the crowns of the adjacent arches to aid in the transmission of load and post members D are formed diametrically from the juncture of the haunches at B to the rim. Laterally extending from the web of the flange and at right angles thereto are the knee members 3 located at and integral with the posts D. At the outward extremity of each knee member is a portion positioned at right angles thereto and being apertured as designated at E to accommodate the lug bolt 4. The said lug bolt is positioned through the felloe in the manner shown in Figs. 2 and 5 and is threaded the greater portion of its length for the accommodation of the nut 5. The latter functions to hold the lug bolt in position when the lugs 6 are removed, to permit the removal of the rim 7 for tire repair, and to firmly affix the flange to the felloe 8 at all times.

It should be noted that the aperture at E is elongated sufficiently to permit insertion of the lug bolts in the knee member and to allow for any error that may exist in the centering of the apertures for the lug bolts in the felloe.

I am fully aware that the art of providing an auxiliary flange or wheel to a vehicle wheel to carry the load upon deflation of a pneumatic tire is old. However, the principle of my invention lies in the construction of the web of the flange with regard to the plane of its elements in combination with the knee members herein disclosed and a positive locking means for the lug bolts.

What I claim as new and desire to secure by Letters Patent is:

In an auxiliary flange for automobile wheels to take the load upon deflation of a pneumatic tire, a flange, the web of which is flat and comprises a plurality of arches and struts as connecting means for the transmission of the load to knee members, the knee members each positioned integral with the web at one of the struts thereon and extending laterally therefrom and having at its outward extremity a portion formed at right angles and parallel with the web, the said portion being apertured to receive a bolt.

In testimony whereof I affix my signature.

ERNEST R. AMBROSE.